C. E. DOMBROWSKY.
CULTIVATING PLOW.
APPLICATION FILED FEB. 26, 1918.
1,302,141.
Patented Apr. 29, 1919.
4 SHEETS—SHEET 2.
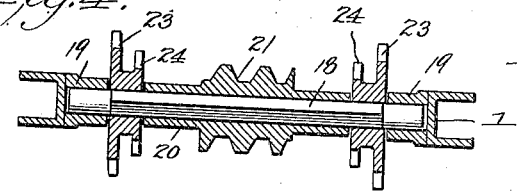
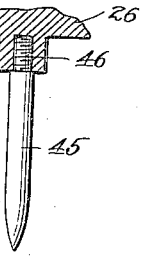
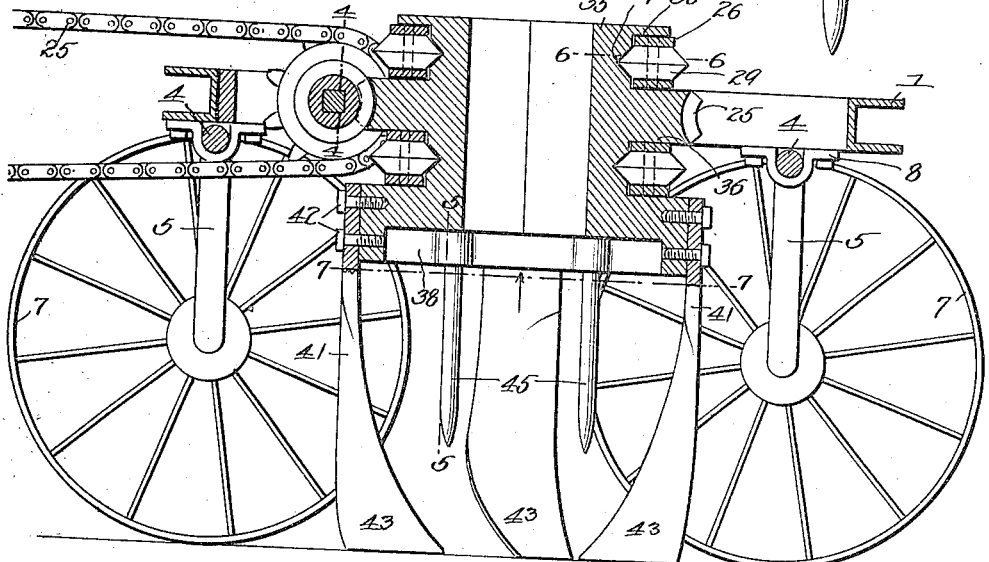
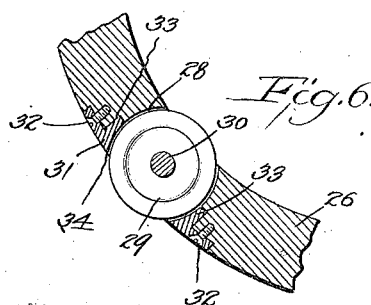
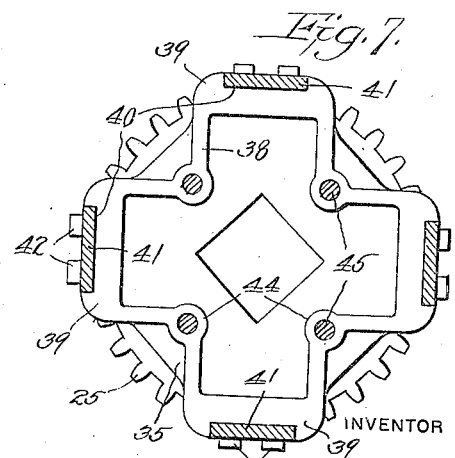
WITNESSES
INVENTOR
Carl E. Dombrowsky
BY
ATTORNEY

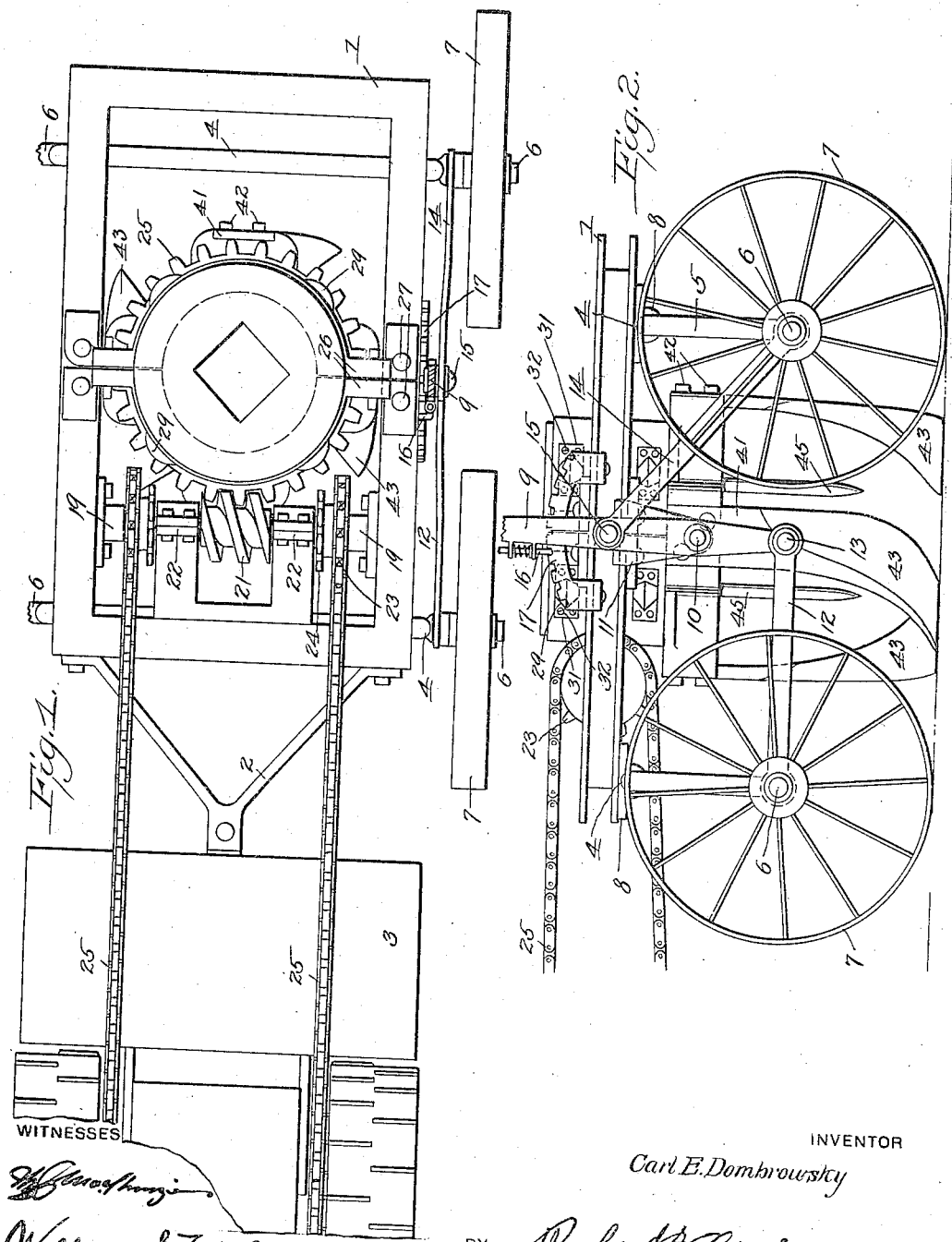

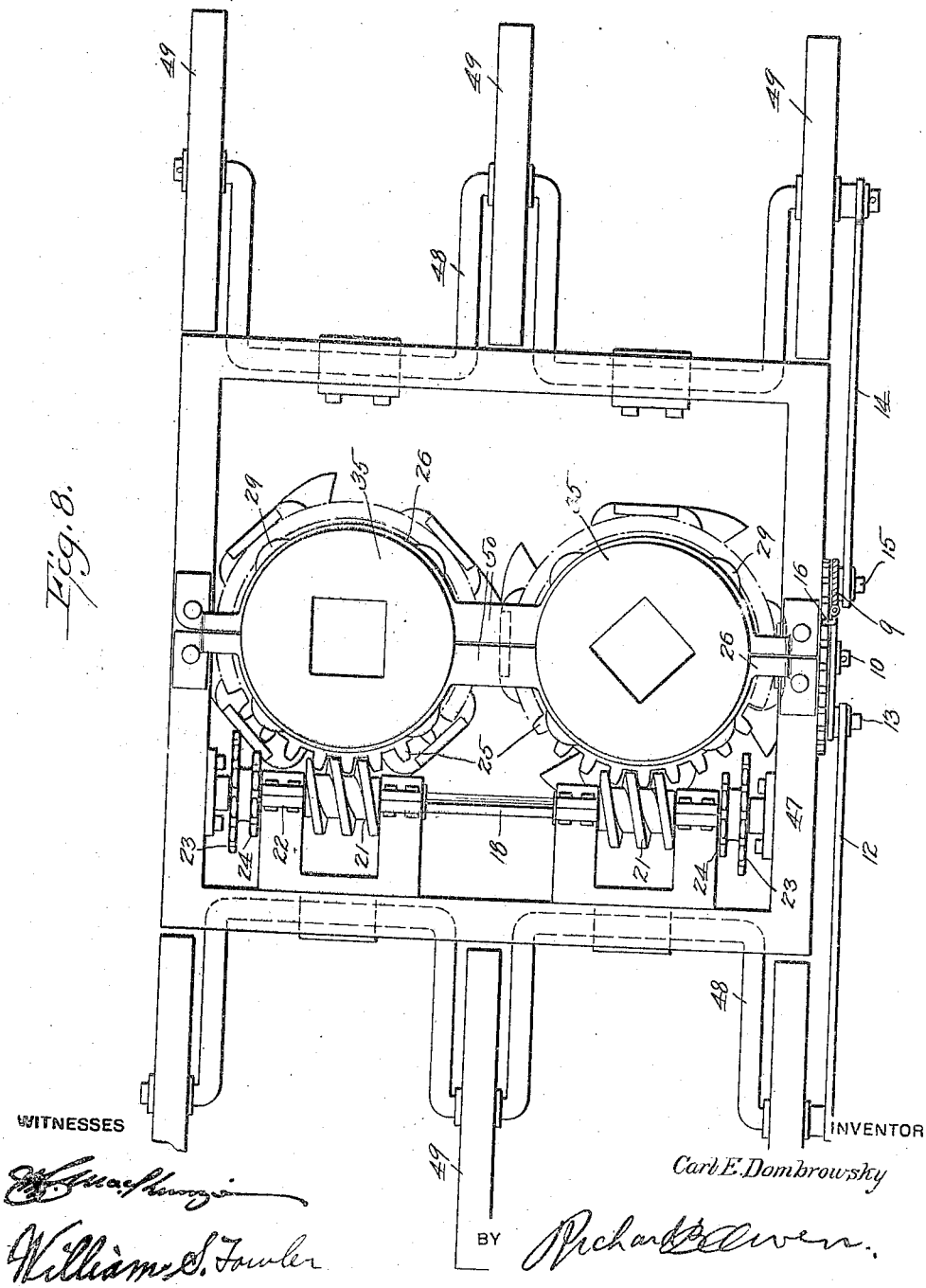

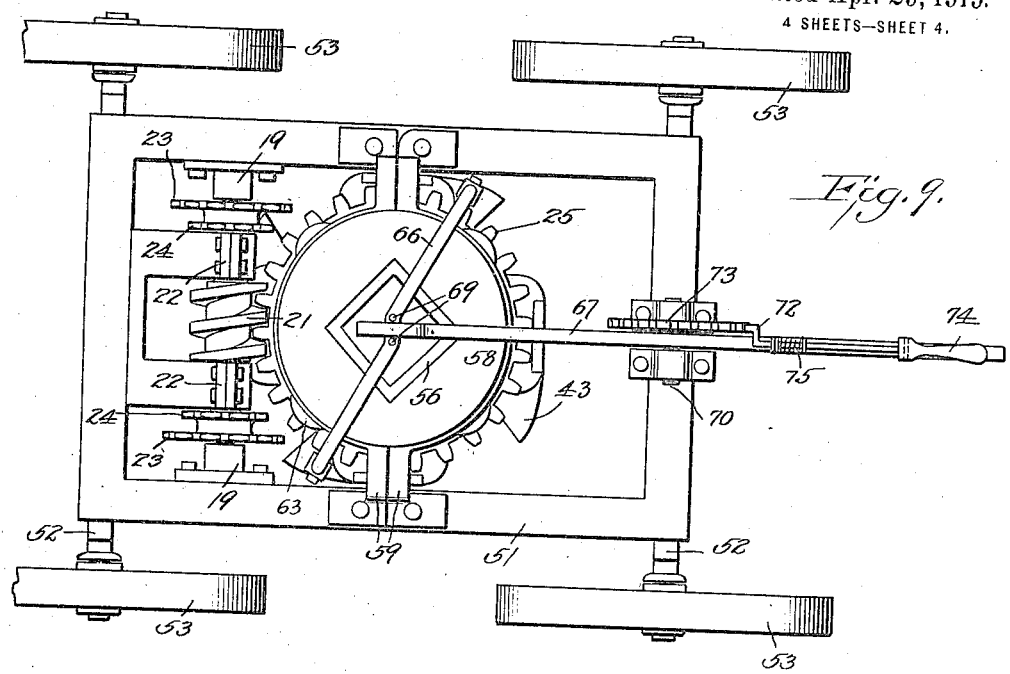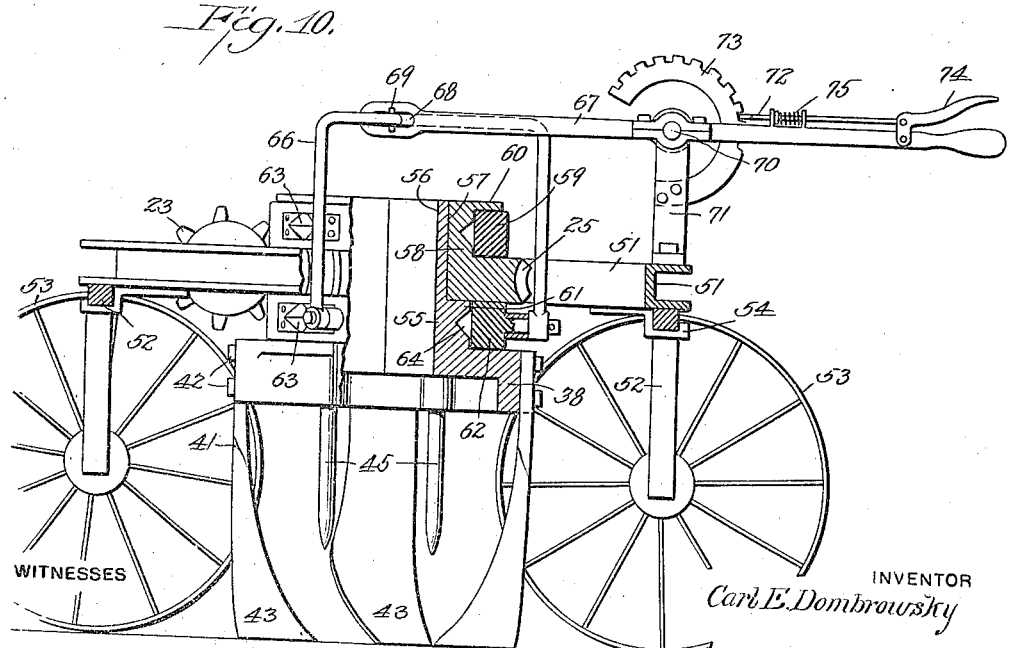

UNITED STATES PATENT OFFICE.

CARL E. DOMBROWSKY, OF NORWICH, CONNECTICUT.

CULTIVATING-PLOW.

1,302,141.  Specification of Letters Patent.  Patented Apr. 29, 1919.

Application filed February 26, 1918. Serial No. 219,281.

*To all whom it may concern:*

Be it known that I, CARL E. DOMBROWSKY, a citizen of Russia, residing at Norwich, in the county of New London and State of Connecticut, have invented certain new and useful Improvements in Cultivating-Plows, of which the following is a specification.

This invention relates to certain new and useful improvements in cultivating implements and relates more particularly to revolving cultivating plows.

An object of the invention resides in the provision of a revolving cultivator plow which will be of simple construction and operation and in which the parts will be so arranged that the plow blades and cultivating members together with the support for the same may be readily raised or lowered to vary the depth to which the soil is to be cultivated.

Another object of the invention resides in the provision of a revolving cultivator plow of the above stated character in which the revolving support for the plow blades and cultivating members is rotatably mounted in a main frame and which latter may be raised or lowered with respect to the supporting wheels to adjust the depth of the cultivation.

A further object of the invention resides in the provision of a novel form of support or head for the plow blades and cultivating members and mounting the same within the main frame so that it may be readily rotated therein.

A further object of the invention resides in the provision of a revolving head mounted in a main frame and rotated from mechanism carried by a traction engine or the like to which the main frame is connected so that plow blades and cultivating members carried by the head may be moved in a circle in the soil within which they are engaged to thoroughly pulverize and cultivate the same as the frame moves forwardly.

A further object of the invention resides in the provision of novel rotating and supporting means for the head, as well as the simple means for raising and lowering the frame.

A still further object of the invention resides in the provision of a revolving plow of the above stated character which will be of extremely simple construction and operation as well as highly efficient in use.

With the above and other objects in view as will be apparent as the description proceeds, the invention consists in the novel combination and arrangement of coöperating parts as hereinafter more specifically stated, shown in the accompanying drawings and pointed out in the appended claims.

In the drawings:—

Figure 1 is a plan view of the preferred form of the invention, showing the same connected with traction engine, Fig. 2 is a side elevation of the preferred form, Fig. 3 is a longitudinal vertical section through the same, Fig. 4 is a longitudinal vertical section through the driving worm as shown in line 4—4 of Fig. 3, Fig. 5 is a detail section on the plane of line 5—5 of Fig. 3, Fig. 6 is a detail section on the plane of line 6—6 of Fig. 3, Fig. 7 is a detail section on the plane of line 7—7 of Fig. 3, looking in the direction indicated by the arrow, Fig. 8 is a plan view of a modified form of the invention, Fig. 9 is a plan view of a further modification, Fig. 10 is an elevation of the form shown in Fig. 9, with parts in section.

Referring more particularly to the drawings, 1 designates the main frame, which has a triangular connecting member 2, by means of which the main frame 1 may be readily connected with a tractor 3 or the like and by means of which the main frame 1 may be drawn across the ground to be cultivated.

The main frame 1 in the preferred form is shown in Figs. 1, 2, 3 and 4. The main frame 1 is supported upon the uppermost or central portions 4 of the front and rear transverse axles which have depending ends 5 with outwardly turned extremities 6 serving as the axle portions upon which the front and rear wheels 7 are mounted for free rotation. It will be understood that the upper or main portions for the front and rear axles are loosely mounted in suitable bearing brackets 8 carried on the under side of the main frame 1. Attention may be called to the fact that the main frame 1 is preferably formed of channel-iron with the sides or flanges thereof directed outwardly.

In order that the main frame 1 may be readily raised or lowered, I have provided a lever 9 which is in vertical position when the main frame 1 is in its uppermost position. This lever 9 is pivotally mounted on the stationary pivot member 10 projecting laterally from the depending plate 11 secured to one side of the main frame 1 and intermediate the ends thereof. This lever 9 has a lower horizontal bar 12 pivoted to its lower end as shown at 13, and also pivotally mounted upon the portion 6 of one end of the front axle 4. A second rod 14 is normally in an inclined plane and has its upper end pivotally mounted upon the lever 9 by the pivot member 15, at a point above the pivot 10. The lower end of this rod 14 is pivotally mounted upon the portion 6 of the corresponding end of the rear axle 4. The lever 9 carries a conventional form of spring actuated locking member 16 adapted for engagement with the pivot of the segmental locking bar 17 mounted upon the side of the main frame 1 in order that the raising and lowering lever 9 may be readily locked in adjusted position. The lever 9 and parts connected therewith and controlled thereby are shown in their normal position in Fig. 2 with the main frame 1 in its uppermost position. It will be evident by referring to this figure that upon movement of the lever 9 rearwardly, the lower end thereof will be forced forwardly, thereby separating the front and rear wheels and moving the lower ends of the front axles outwardly in opposite directions, thereby resulting in a lowering of the main frame 1 with the parts mounted thereon and which parts will be later clearly and specifically described. Movement of the lever 9 in the reverse direction will result in returning all of the parts to the position shown in Fig. 2.

The main frame 1 has a transverse shaft 18 which has its opposite ends mounted in the bearings 19 carried by the opposite side members of the main frame 1 adjacent the front portion thereof. The main portion of the shaft 18 is square in cross section and has the sleeve 20 mounted thereon with the driving worm 21 formed on its central portion. The sleeve 20 is of exterior cylindrical form at its opposite end portions in order that two part bearing members 22 may be engaged therearound, said bearing members 22 being connected with the front end of the main frame 1. Between the sleeve 20 and the bearings 19, are positioned the large and small sprocket wheels 23 and 24. It will be understood that a large sprocket wheel 23 and a small sprocket wheel 24 are arranged at each end of the main portion of the shaft 18 and formed together. A pair of driving chains 25 extend around either the large sprocket wheels 23 or the small sprocket wheels 24 to drive the shaft 18 and worm gear 21.

The worm gear 21 meshes with and drives the worm wheel 25. This wheel 25 is mounted in upper and lower segmental bearing members 26, which latter are arranged in pairs, the opposed ends of said pairs of segmental bearing members 26 being directed outwardly and then turned and secured to the upper and lower faces of the main frame 1, at points about the longitudinal center of the side members of said main frame 1, as clearly shown at 27 in Fig. 1. Each segmental bearing member 26 is provided with transverse recesses or pockets 28 to accommodate the anti-friction rollers 29, one roller being positioned in each recess or pocket as clearly shown in the drawings. A vertical shaft 30 is provided for each roller 29 and each roller 29 is beveled from the center of its periphery and toward its opposite or upper and lower flattened ends. This may be readily understood by referring to Figs. 3 and 6. Plates 31 are secured to the outer convex face of each segmental bearing member 26, by suitable securing members 32. A plate 31 is provided for closing the outer side of each recess or pocket 28, and has inwardly directed flanges 33, which extend into the recess or pocket 28 and are formed to correspond with the periphery of roller 29, it being understood that an opening 34 is formed in the center of the plate 31 to permit a portion of the roller 29 to project through the same, as clearly shown in Fig. 6 of the drawings.

The worm gear wheel 25 is formed on the outer face of the casting 35 and this casting 35 has circumferential recesses or pockets 36, above and below the gear wheel 25. These recesses or pockets 36 receive the segmental bearing members or supports 26, as will be readily understood by referring to the drawings. The casting 35 is also provided with circumferential grooves 37 having opposite diverging walls. The grooves 37 are extended inwardly from the center of the inner or vertical walls of the recesses or pockets 36, so that the anti-friction rollers 29 may engage and rotate in the grooves 37 as the casting 35 is revolved by operation of the worm drive 21 and the worm wheel 25.

The casting 35 is preferably hollow and has a depending flange 38 around its lower edge. This flange 38 has opposite outwardly positioned portions 39 arranged in pairs and provided with central recesses 40 in their outer faces. The plow blades 41 have flattened upper ends which fit snugly in the pockets 40 and are secured in position by suitable securing members 42 which extend into the flange 38 of the castings 35. The plow blades 41 are flared toward their lower ends and curved transversely in one direction, as shown at 43, all of the blades being correspondingly curved. The arrangement of the plow blades may be readily understood by referring to the several views of the drawings. From the outwardly offset portions 39 of the flange 38, the latter is extended inwardly to form inner corner portions 44 between the offset portions 39. The corner portions 44 form sockets to receive pulverizing pegs 45 which will serve to pulverize the lumps of earth thrown up by the plow blades 43 as the implement is moved over the ground and the casting 35 rotated, resulting in a churning action of the plow blades 43 and 45 to pulverize and cultivate the earth at the same time that the plowing operation is performed. The pulverizing pegs 45 are preferably provided with reduced threaded upper ends 46 by means of which the pegs 45 may be secured in position, the pegs 45 terminating in lower pointed ends. It is believed that the operation of all of the parts of this form may now be thoroughly understood without further detailed description.

In Fig. 8 I have shown a modified form in which a main frame 47 is supported upon the forward and rearward axles 48, which have the supporting wheels or ground wheels 49 mounted upon their downwardly offset portions, three wheels being employed for each axle. The mechanism for raising and lowering the main frame 47 is the same in this form as in the preferred form and therefore the parts of this mechanism are given the same designating numerals and further description of the same is therefore unnecessary.

The frame 47 is employed in a double plow and cultivator and therefore two separate castings 35 are mounted or suspended in the frame 47. The castings are the same as in the preferred frame and all of the parts carried by the castings 35 are the same. The supporting members 26, however, are extended from one side of the frame 47 to the other, each member 36 having two semi-circular portions and a straight central connecting portion 50. A shaft 18 in the form shown in Fig. 8, is provided with two spaced worm drive gears 21 for the separate worm wheels 25 of the two castings 35. It will be understood by referring to Fig. 8, that the axles 48 are shown as being swung outwardly to lower the frame and parts mounted therein.

In Figs. 9 and 10 I have shown a further modification, in which the main frame 51 is mounted upon the stationary forward and rearward axles 52 having the supporting or ground wheels 53 rotatably mounted upon their outwardly offset lower ends, suitable means 54 being provided for supporting the main or central portions of the axles 52 beneath the opposite ends of the frame 51. In this form, the casting suspended in the frame is formed in two telescoping sections, one of the sections being slidably mounted in the other. The slidably mounted section 55 carries the plow blades 41 and the pulverizing pegs 45 in the usual manner. The section 55 of the casting is provided with an upstanding flange 56 preferably of rectangular form and slidable in a corresponding central opening 57 of the upper section 58 of the casting. This upper section 58 carries the worm wheel 25, which is beneath the upper supporting members 59. The supporting members 59 are of semi-circular form and have their ends extended outwardly and secured upon the frame 51, in the same manner as the supporting members 26 in the preferred form. This section 58 also has an upper annular flange 60, which extends over the supporting members 59, thereby preventing downward movement of the section 58. The lower or slidable section 55 is provided with an annular flange 61 above the flange 38 which has been described in the preferred form and between the flange 61 and the flange 38, is positioned a supporting ring 62, which carries bearing rollers 63 corresponding to the bearing rollers 29 of the preferred form and engaging in the annular groove 64 provided therefor in the outer face of the casting section 55. The supporting ring 62 has upper and diametrically opposite arms 65, upon which are mounted the opposite depending ends of the raising member 66, which latter is of substantially U-shaped form. The position of the raising member 66 is governed by means of the lever 67, which has a slotted end 68, from which the central turned portion of the raising member 66 is extended, stop pins 69 being carried by the raising member 66 to limit sliding movement of the same through the end of the lever 67. The lever 67 swings upon its pivot pin or fulcrum 70 carried in the support 71 mounted upon one end of the frame 51. The lever 67 is adapted to be secured in adjusted position after being operated to raise or lower the section 55 of the casting and thereby regulate the depth to which the plow blades 41 are to penetrate the ground, by the conventional form of locking member 72 adapted for engagement with the teeth of the rack segment 73, which latter is also mounted upon the support 71. Locking means for the lever 67 also includes a releasing finger 74 for the locking member 72 and a spring 75 for returning the locking member 72 into engagement with the teeth and the rack segment 73.

As it is believed all of the parts of the invention should be clearly understood from the foregoing, further description is deemed unnecessary. I wish it to be understood, however, that while I have disclosed what I now believe to be the preferred embodiments, minor changes in the details of construction and arrangement of parts may be resorted to within the scope of the appended claims without departing from the spirit of the invention.

I claim:—

1. In a cultivator, a frame, a worm wheel having oppositely extending elongated hub portions, each hub portion having an annular groove formed therein, a rotatably mounted bearing seated in said groove to support said worm wheel, cultivator implements carried by said worm wheel, a worm mounted on the frame to engage said worm wheel, and means for rotating said worm.

2. In a cultivator, a worm wheel mounted therein for rotation in a horizontal plane, an enlarged hub portion thereon, a plurality of radial arms formed on said hub portion to carry cultivator implements on their outer ends, the inner portion of the arms being connected to each other, and said connected portions having apertures in which to receive the shanks of other cultivator implements, and means for rotating said worm wheel.

3. In a cultivator, a frame, a pair of arched axles each axle having a double arch formed therein, three ground wheels carried by each of said axles, levers on the frame connected to the arched axles to raise and lower the frame, a pair of worm wheels mounted in said frame, means on said worm wheel to support cultivator implements, a shaft journaled in the frame, and a pair of worms carried by said shaft for meshing engagement with the worm wheels to rotate the same.

In testimony whereof I affix my signature in presence of two witnesses.

CARL E. DOMBROWSKY.

Witnesses:
 ADOLPH A. WOLRODEN,
 ARTHUR F. LIBBY.

Copies of this patent may be obtained for five cents each, by addressing the "Commissioner of Patents, Washington, D. C."